US009790825B2

(12) United States Patent
Nation

(10) Patent No.: US 9,790,825 B2
(45) Date of Patent: Oct. 17, 2017

(54) DEVICE TO DIRECT LUBRICANT IN A LUBRICATING ASSEMBLY AND IMPLEMENTATION THEREOF

(71) Applicant: Howden Roots LLC, Wilmington, DE (US)

(72) Inventor: Cory Alfred Nation, Connersville, IN (US)

(73) Assignee: Howden Roots LLC, Wilmington, DE (US)

(*) Notice: Subject to any disclaimer, the term of this patent is extended or adjusted under 35 U.S.C. 154(b) by 182 days.

(21) Appl. No.: 14/556,170

(22) Filed: Nov. 30, 2014

(65) Prior Publication Data

US 2015/0308307 A1 Oct. 29, 2015

Related U.S. Application Data

(60) Provisional application No. 61/985,162, filed on Apr. 28, 2014.

(51) Int. Cl.
*F01M 11/02* (2006.01)
*F01M 9/06* (2006.01)
*F16N 7/26* (2006.01)

(52) U.S. Cl.
CPC .............. *F01M 11/02* (2013.01); *F01M 9/06* (2013.01); *F16N 7/26* (2013.01)

(58) Field of Classification Search
CPC .................................. F01M 11/02; F01M 9/06
(Continued)

(56) References Cited

U.S. PATENT DOCUMENTS 126,624 A 5/1872 Coffee
217,667 A 7/1879 Cary
(Continued)

FOREIGN PATENT DOCUMENTS

BE 442 640 A 10/1941
BE 505 519 A 9/1951
(Continued)

OTHER PUBLICATIONS

International Search Report and Written Opinion mailed Jul. 31, 2015 for corresponding PCT/US2015/027953 filed Apr. 28, 2015.
(Continued)

*Primary Examiner* — William E Dondero
*Assistant Examiner* — Mark K Buse
(74) *Attorney, Agent, or Firm* — Edell, Shapiro & Finnan, LLC

(57) ABSTRACT

A lubricant assembly that is configured as part of a lubricating system that flings, or slings, fluid lubricants about the interior of compressors. In one embodiment, the lubricant assembly includes a lubricant guide member with a body member that has a pair of peripheral side members with angled surfaces. The construction is amenable to more consistent fabrication constraints (e.g., tolerances), as well as to offer features that can improve operation of the lubricating system, e.g., as operative in the compressors. In use, the lubricant guide member is disposed transverse to a longitudinal axis of a shaft that is configured to rotate a slinger member to fling the lubricant. This configuration captures lubricant that falls downwardly from other parts of the compressors. The angled surfaces of the side members direct this captured lubricant toward the shaft, and other rotating components, of the lubricating system.

20 Claims, 6 Drawing Sheets

(58) Field of Classification Search
USPC .................................................. 184/11.2
See application file for complete search history.

(56) References Cited

U.S. PATENT DOCUMENTS

| | | |
|---|---|---|
| 589,597 A | 9/1897 | Freeman |
| 1,262,798 A | 4/1918 | Huebotter |
| 1,341,080 A | 5/1920 | Scholes |
| 1,345,903 A | 7/1920 | Vincent |
| 1,367,674 A | 2/1921 | Spence |
| 1,569,404 A | 1/1926 | Smith |
| 2,074,980 A * | 3/1937 | Christensen .......... F04B 27/005 184/6.27 |
| 2,669,322 A | 2/1954 | Brown |
| 2,929,663 A | 3/1960 | Hoeltje |
| 2,972,903 A | 2/1961 | Lee |
| 3,144,097 A | 8/1964 | Ebert |
| 3,325,232 A | 6/1967 | Pabst et al. |
| 3,847,249 A | 11/1974 | Oehring |
| 4,231,266 A * | 11/1980 | Nishikawa .......... F16C 33/6659 184/11.1 |
| 4,523,118 A | 6/1985 | Cunningham |
| 4,648,485 A | 3/1987 | Kovaleski |
| 4,701,060 A | 10/1987 | Gu |
| 4,964,489 A | 10/1990 | Patel |
| 5,321,951 A | 6/1994 | Falls et al. |
| 5,369,952 A | 12/1994 | Walters |
| 5,724,934 A | 3/1998 | Faraci et al. |
| 7,124,857 B2 | 10/2006 | Gekht et al. |
| 7,524,112 B2 | 4/2009 | Gerez et al. |
| 7,625,126 B2 | 12/2009 | Peters et al. |
| 2013/0084035 A1 | 4/2013 | Williams et al. |
| 2015/0308306 A1 | 10/2015 | Nation |
| 2015/0308506 A1 | 10/2015 | Nation |

FOREIGN PATENT DOCUMENTS

| | | |
|---|---|---|
| DE | 1525909 U | 9/1970 |
| GB | 760817 A | 11/1956 |
| JP | S5447049 A | 4/1979 |
| JP | H01305103 A | 12/1989 |
| JP | H0711924 A | 1/1995 |
| JP | H0923613 A | 1/1997 |
| JP | 2004132319 A | 4/2004 |

OTHER PUBLICATIONS

Search Report for PCT/US2015/027868 dated Jul. 31, 2015.
Search Report for PCT/US2015/027880 dated Aug. 7, 2015.

* cited by examiner

DEVICE TO DIRECT LUBRICANT IN A LUBRICATING ASSEMBLY AND IMPLEMENTATION THEREOF

CROSS-REFERENCE TO RELATED APPLICATIONS

This application claims the benefit of priority to U.S. Provisional Application Ser. No. 61/985,162, filed Apr. 28, 2014, and entitled "LUBRICATING MEMBERS, LUBRICATING ASSEMBLY, AND LUBRICANT DISPERSAL SYSTEM COMPRISED THEREOF."

BACKGROUND

This disclosure relates generally to lubricating systems found on compressors and machinery that can pressurize a working fluid and, more specifically, to an improved lubricant guide member that directs lubricant into a reservoir to maintain a volume of lubricant therein.

Most industrial machinery incorporates a myriad of moving parts that are necessary for the machinery to perform its intended functions. Compressors, for example, include many parts that are in contact and move (e.g., rotate, translate, etc.) relative to other parts, often at high speeds and/or under heavy loads. Parts that operate under these conditions for long periods of time can wear, which can eventually cause failures that interrupt operation of the machinery. To avoid such problems, compressors will utilize lubricants such as oils, greases, and like substances that can reduce friction between moving parts. The lubricants can help to avoid breakdown of the moving parts. Nominally, an effective lubricating fluid management design is required to disperse the lubricant to the rotating components and collect it for further use.

One particular lubricating fluid management design is a splash lubricating oil system. Examples of these systems have a shaft and a flat plate body (or "slinger") having a circular or disc shape and a rolled peripheral edge. In operation, the shaft rotates the slinger to pass the rolled peripheral edge through the reservoir of lubricant. Rotation of the slinger generates centrifugal action that effectively transfers, or slings, the lubricant from the rolled peripheral edge. This action splashes the lubricant randomly on the interior surfaces of the compressor. In some applications, a guide member may be utilized to catch lubricant that falls back down toward the lubricant system. However, due to the harsh operating environment in some compressors, conventional guide members have failed for unforeseen reasons.

BRIEF DESCRIPTION OF THE INVENTION

This disclosure describes improvements to members found in splash lubricating oil systems. These improvements provide features that can enhance performance, extend useful life, simplify manufacture, and make the members more amenable to consistent fabrication constraints (e.g., tolerances). As noted more below, at least one improvement provides embodiments of a lubricant guide member that is configured to better gather and direct lubricant toward the moving parts of the lubricating systems. This lubricant guide member can form part of a passive, gravity-assisted lubricant return mechanism, which captures more lubricant that falls onto and/or proximate the clamp member than similar parts in conventional splash lubricating oil systems.

In one aspect, the embodiments can include a body member that is configured to capture and direct lubricant toward rotating components of the lubricating system. The body member has a central portion and side members formed unitarily or monolithically together, often from a single piece of material (e.g., sheet metal). The body member includes a front side and an opposing back side. When installed in the lubricating system, the body member is disposed transverse to a longitudinal axis of a shaft that is configured to rotate a slinger member to fling the lubricant. In one embodiment, the central portion has a centerline and a primary attachment feature, for example, through-holes that are disposed on either side of the centerline. These holes are configured to align with corresponding features on a bearing clamp member that at least partially circumscribes a shaft that rotates the slinger member to fling the lubricant during operation of the lubricating system. The side members can include a first side member and a second side member joined to the body member symmetrically on either side of the centerline. Each of the first side member and the second side member can have a first member forming a lubricant flow surface extending transversely away from the body member toward the back side. The first side member and the second side member can also include a second member extending transversely from a back edge of the first member. The second member can define a secondary attachment feature, which can also comprise through-holes that align with corresponding features on the bearing assembly.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

The embodiments herein incorporate improvements that address certain problems found in conventional lubricating systems for use with compressors. As used herein, the term "compressor" describes machinery (including compressors and blowers) that acts on a working fluid, for example, to pressurize the working fluid to distribute on a process line. Examples of the process lines may be found in various applications including chemical, petro-chemical, resource recovery and delivery, refinery, and like sectors and industries. However, this disclosure does not foreclose use of the improvements, in whole or in part, in applications that can benefit from the distribution of lubricant that arises from the embodiments contemplated herein.

The discussion that follows describes embodiments of a lubricant guide member and related lubricating system that disperse lubricant in compressors and like machines. These embodiments are useful to capture and direct lubricant to components of the lubricating system. In conventional practice, the guide member is formed from up to five separate pieces and uses extensive welding that can result in significant labor costs. The welds often reside in critical areas that are sensitive to loading and/or vibration. In use, the conventional guide member typically requires two bolts to fasten to an adjoining structure. This conventional configuration, however, can leave the guide member largely unsupported, causing the guide member to be cantilevered when subject to the significant vibrations that result from operation of the compressor.

Notably, after multiple lubricant guide members failed in the field, resulting in expensive warranty claims, an engineering study, including 3-D element modeling, was undertaken to determine the static and dynamic forces to which the guide member was subjected. The study offered evidence that the lubricant guide member was subjected to unforeseen modal stresses and high cycle fatigue, peak stresses greater than 21 kpsi, and part deflections of 0.066 inches. The embodiments disclosed herein address the findings of this study, while at the same time providing improved lubricant capture and transport to the components of the lubricating system.

Figure 1:
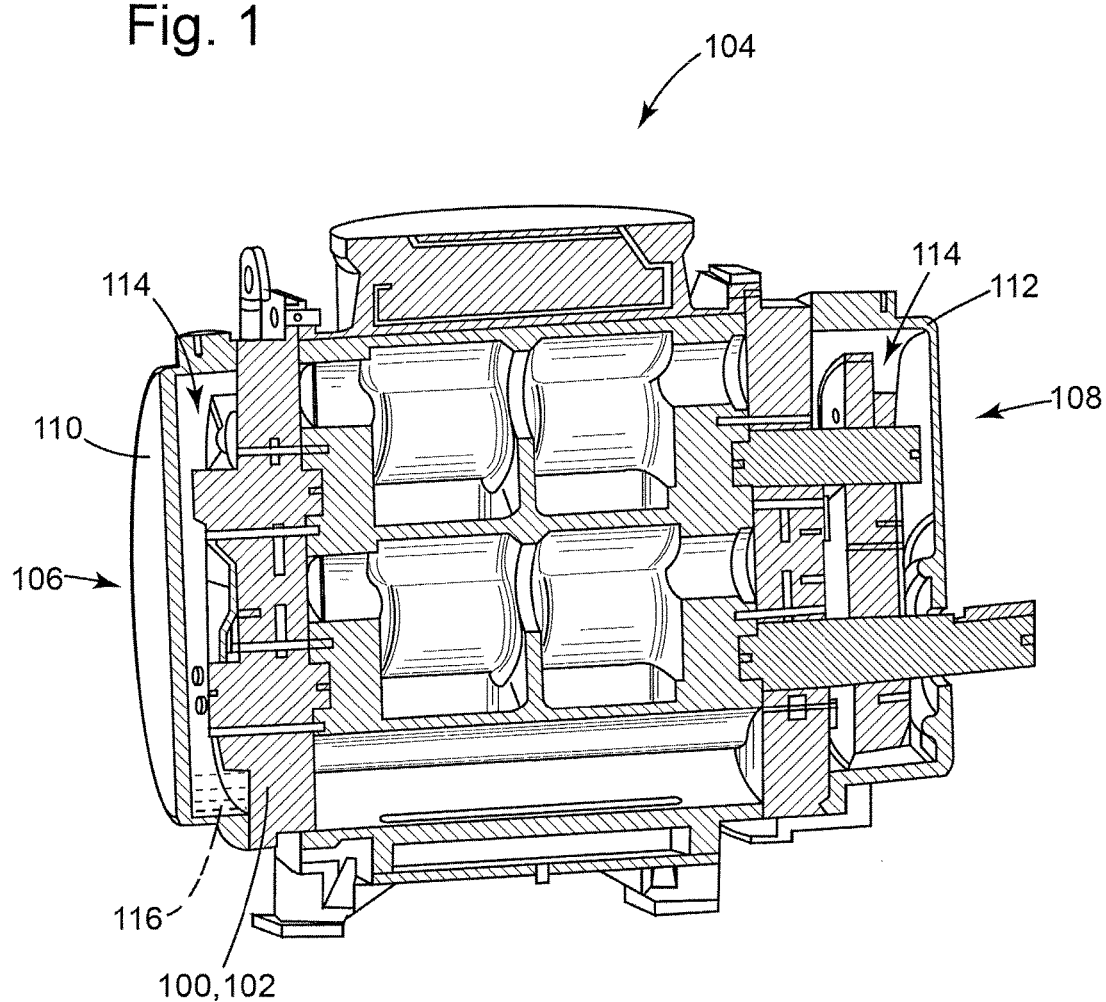
FIG. 1 depicts a cross-section of an exemplary embodiment of a lubricating system as part of an example of a compressor, shown illustratively as a blower.

FIG. 1 generally depicts an exemplary embodiment of a lubricating assembly 100 as seen in a cross-sectional view of a compressor. The lubricating assembly 100 is part of a lubricating system 102 found herein in a blower 104. In connection with the illustrated embodiment, the blower 104 has a first side 106 and a second side 108, each of which can incorporate a cover member (e.g., a first cover member 110 and a second cover member 112). The cover members 110, 112 may form a chamber 114 that can house a fluid 116, typically a lubricant (and/or friction reducing substance) with viscosity suitable for lubricating parts of the blower apparatus 104. On the first side 106, the lubricating system 102 resides proximate the lower part of the chamber 114 to locate one or more parts of the lubricant assembly 100 in contact with the fluid 116.

Examples of the lubricating system 102 are also known as "oil slinger" systems and/or "splash lubrication oil systems." As noted herein, these names are synonymous of systems that operate rotating components to move, or "sling," lubricant (or other fluids) from a lower part of the chamber 114 to an upper part of the chamber 114. This action disperses the lubricant onto components (e.g., gears, bearings, etc.) that require lubricant to reduce friction and avoid wear and premature breakdown. The lubricating assembly 100 is configured to capture and retain some of the lubricant that falls back down toward the bottom of the chamber 114 (FIG. 1). These configurations direct the lubricant into the interior components of the lubricating system 102, thereby increasing the availability of lubricant to maintain appropriate lubrication of components during operation of the lubricating system 102.

Figure 2:
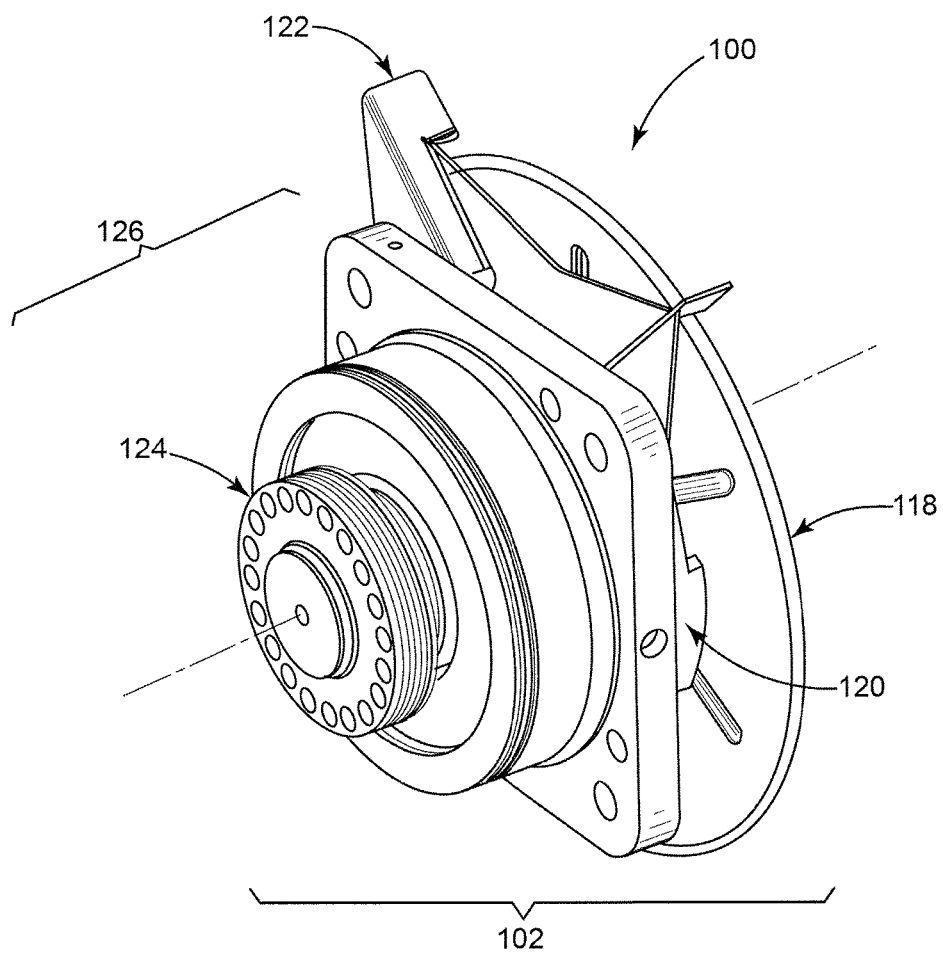
FIG. 2 depicts a perspective view of an exemplary embodiment of a lubricating system for use on the blower of FIG. 1.
Figure 3:
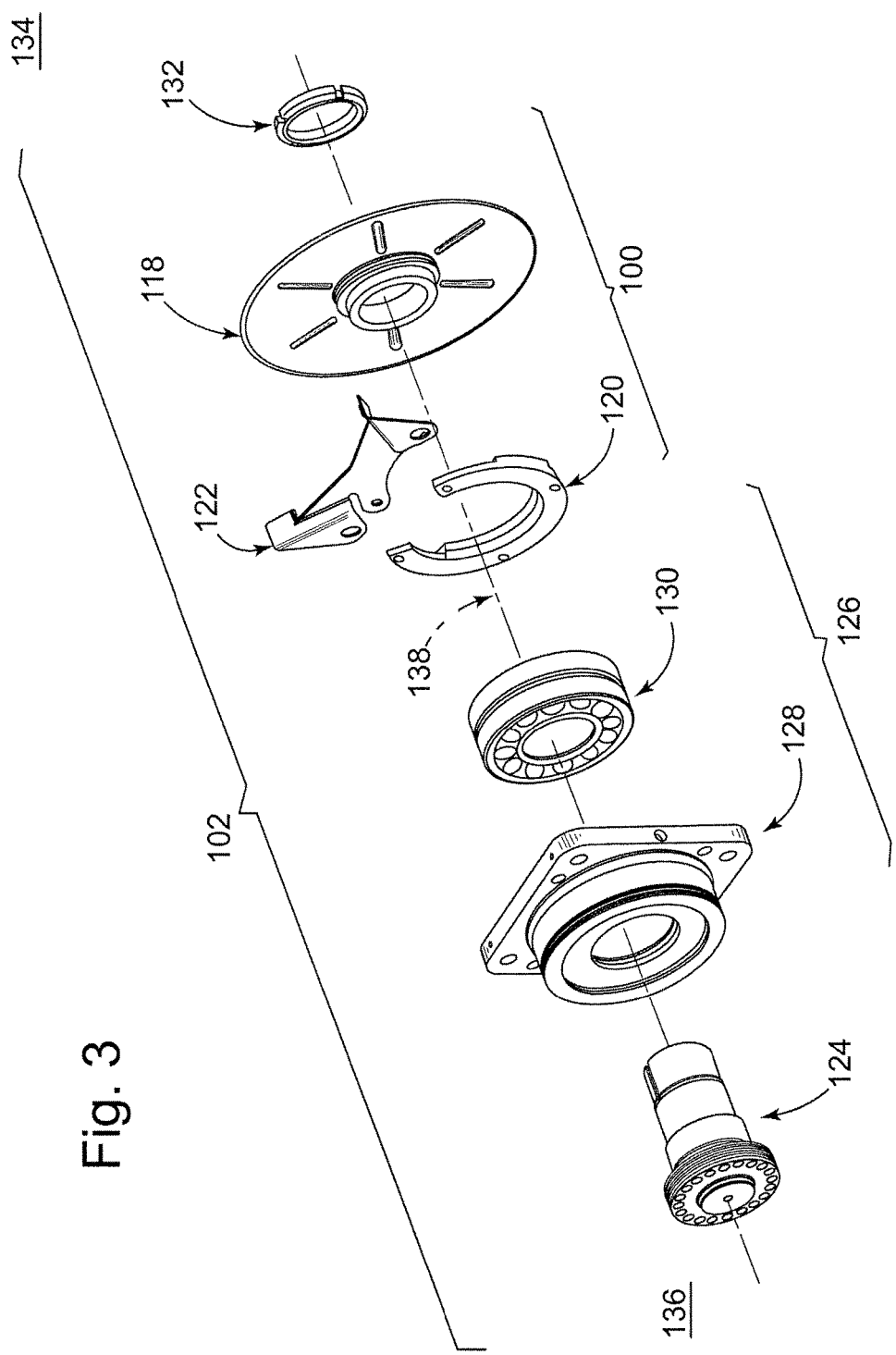
FIG. 3 depicts the lubricating system of FIG. 2 in exploded form.

FIGS. 2 and 3 depict the lubricating assembly 100 separated from the blower apparatus 104 (FIG. 1) to highlight some additional features. FIG. 2 depicts a perspective view of an exemplary embodiment of the lubricating assembly 100. FIG. 3 depicts the lubricating assembly 100 in exploded form, still implemented as part of and shown together with the lubricating system 102.

Referring to FIGS. 2 and 3, the lubricating assembly 100 can include a slinger member 118, a bearing clamp member 120, and a lubricant guide member 122. The lubricating system 102 may include a shaft member 124 and a bearing assembly 126. In one example, the lubricant guide member 122 is configure to couple with the bearing clamp member 120 in position between the slinger member 118 and the bearing assembly 126. As best shown in FIG. 3, the bearing assembly 126 can include a bearing carrier member 128 and a bearing member 130. The lubricating system 102 can further include a locking member 132, such as a peripheral lock nut. For reference, the lubricating assembly 100 and lubricating system 102 are shown to have a front side 134 (also, "first side 134"), a back side 136 (also, "second side 136"), and a longitudinal axis 138 extending therethrough. The designation of the terms "front side" and "back side," however, also translate to individual components, e.g., the bearing clamp member 120 and the lubricant guide member 122, as indicated during the discussion herein. Likewise, use of the longitudinal axis 138 can extend to one or more of the other components of the lubricating assembly 100, as necessary. body In one implementation, the shaft member 124 has a first end, a second end, and an axis that aligns with the longitudinal axis 138. The shaft member 124 can insert into one or more components. This feature positions each of the slinger member 118, the bearing clamp member 120, and the components of the bearing assembly 126 on the shaft member 124 in alignment with the axis. On the front side 134, the first end of the shaft member 124 is typically exposed to accept the locking member 132, which engages the first end of the shaft member 124 to secure the parts of the lubricating system 102 together. The second end of the shaft member 124 can receive a belt and/or other drive mechanism. During operation of the lubricating system 102, the drive mechanism can rotate the shaft member 124 about the longitudinal axis 138. The shaft member 124, in turn, rotates the slinger member 118, which picks up lubricant from the bottom of the chamber 114 (FIG. 1) and slings the lubricant into the rest of the machinery. Lubricant that does not adhere to components falls back down toward the chamber 114 (FIG. 1). The lubricant guide member 122 is configured to capture some of the falling lubricant. Examples of the lubricant guide member 122 often have sloped and/or angled surfaces that can direct captured lubricant toward the interior of the bearing clamp member 120.

Figure 4:
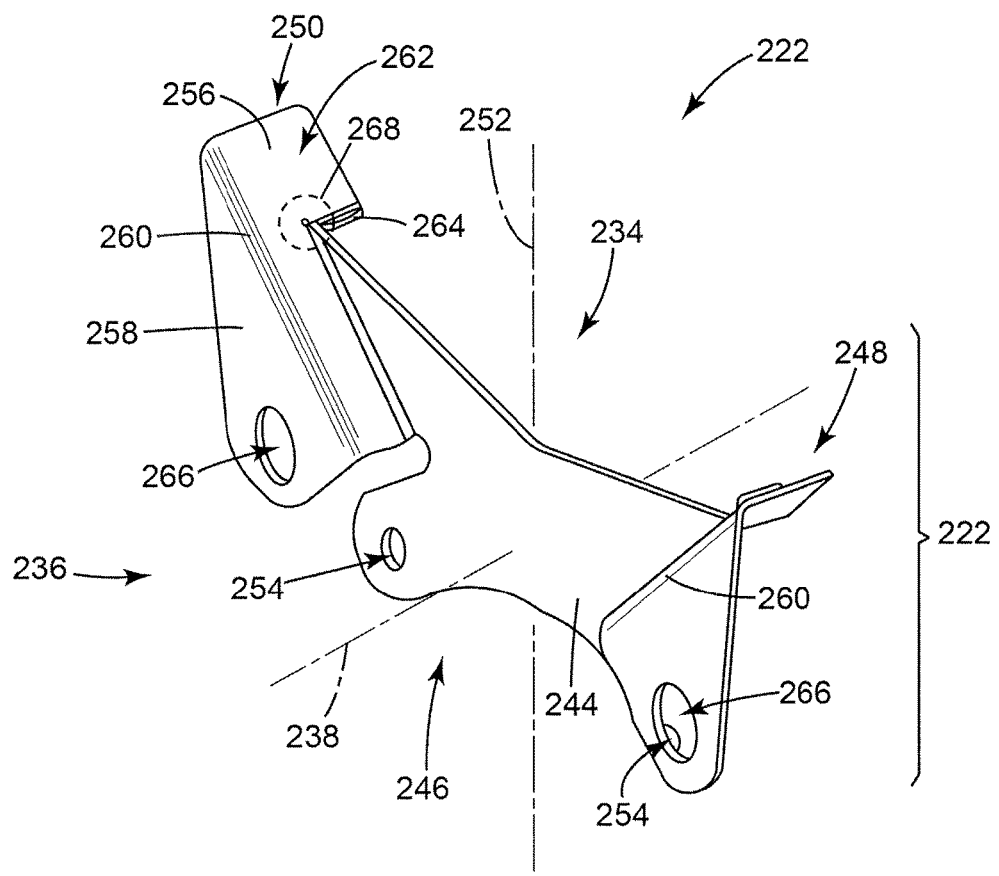
FIG. 4 depicts a perspective view of an exemplary embodiment of a lubricating assembly with focus on an example of a lubricant guide member.
Figure 5:
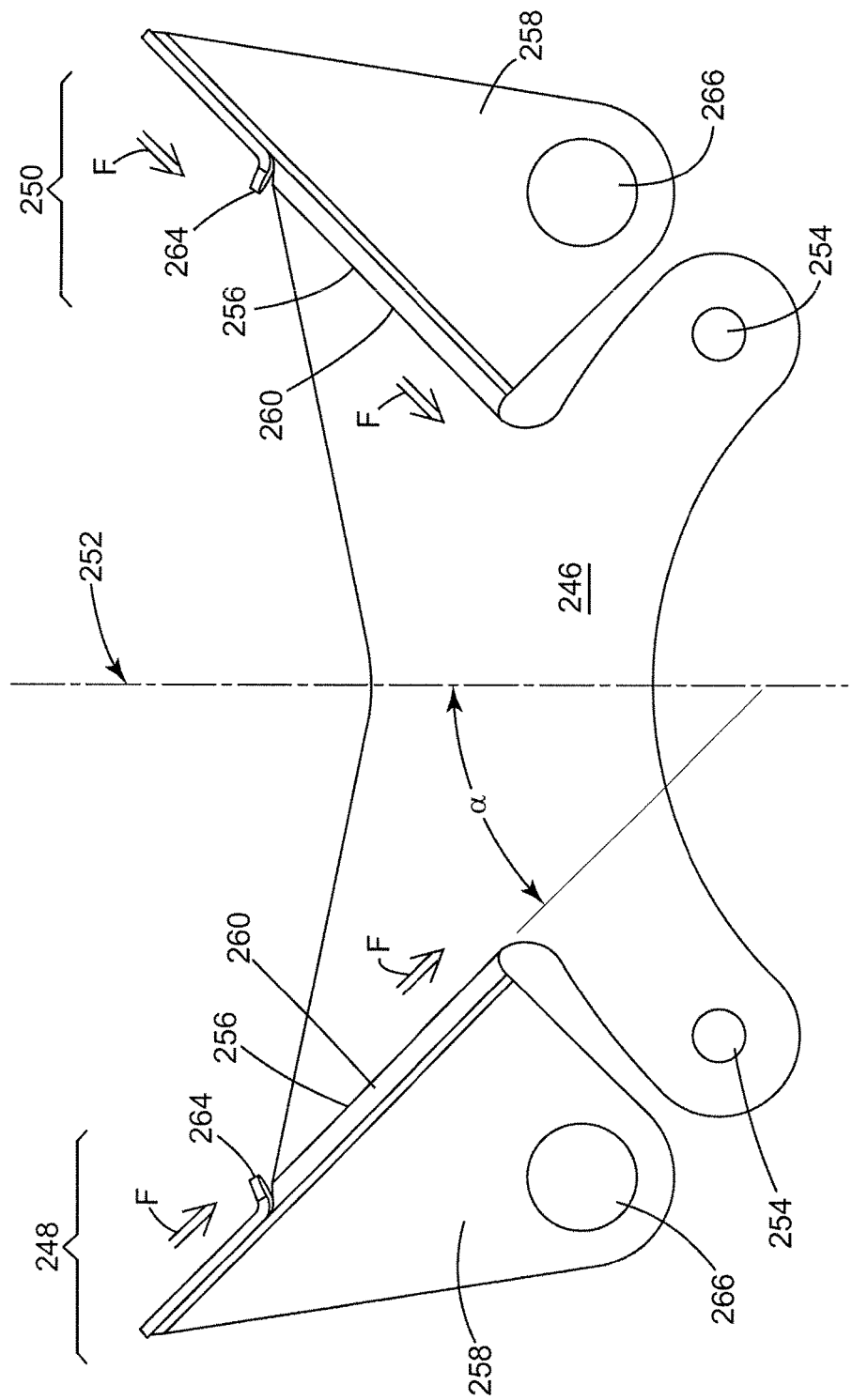
FIG. 5 depicts a front view of the lubricating assembly of FIG. 4.
Figure 6:
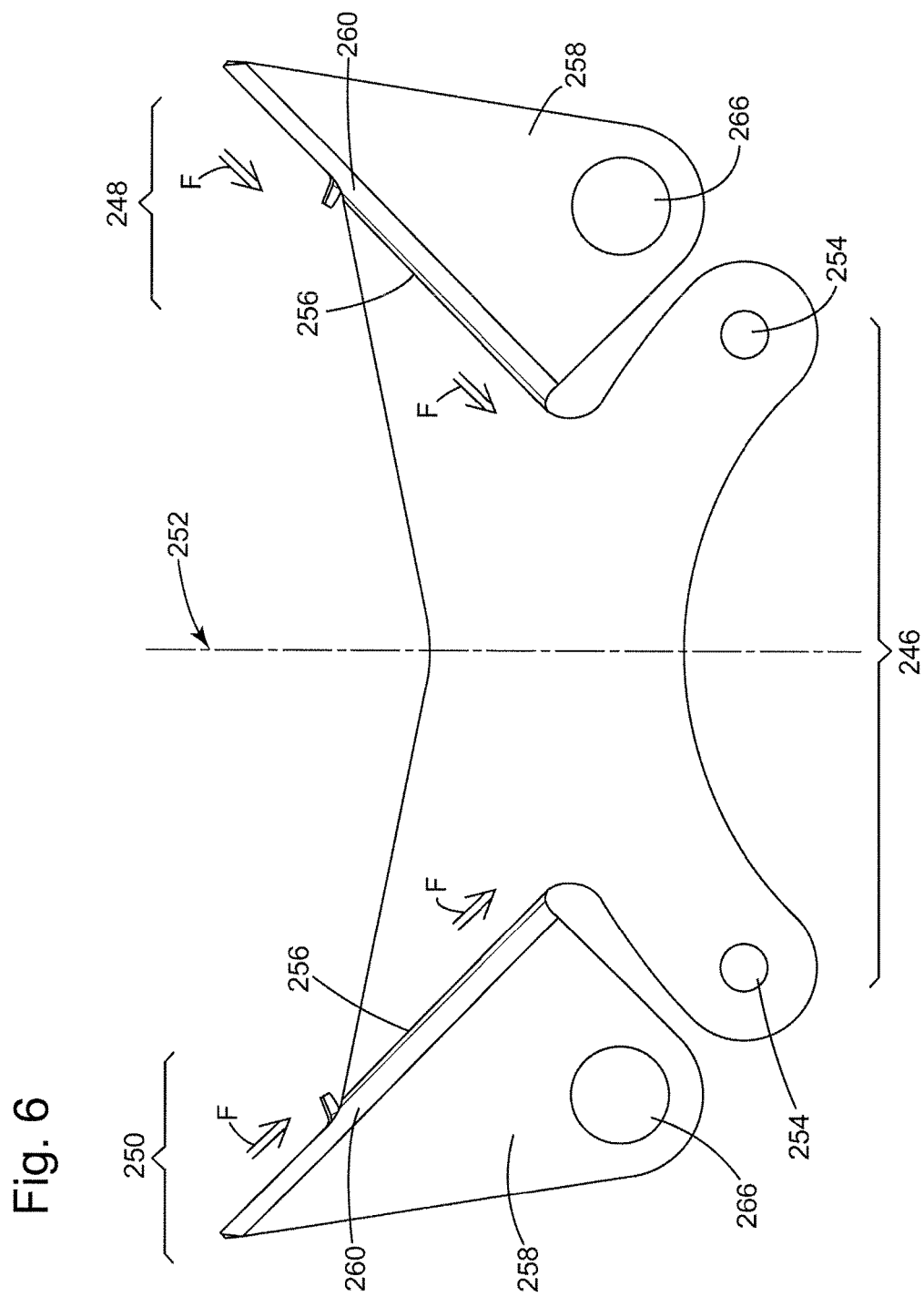
FIG. 6 depicts a back view of the lubricating assembly of FIG. 4.

FIGS. 4, 5, and 6 depict exemplary embodiments of a lubricating assembly 200 with some parts removed to focus the discussion on an example of the lubricant guide member 222 (also, "oil leader 222"). FIG. 4 provides a perspective view of the lubricant guide member 222. FIGS. 5 and 6 provide an elevation view taken from, respectively, the front side 234 and the back side 236. Lubricant guide member 222 illustrated in FIGS. 4, 5, and 6 is identical to, and the same as, that of lubricant guide member 122 illustrated in FIGS. 2 and 3. Thus, reference numerals 122 and 222 have been used interchangeably when referring to the lubricant guide member.

Referring to FIGS. 4, 5, and 6, the lubricant guide member 222 includes a body member 244 having a central portion 246 and a pair of peripheral, or side, members or portions (e.g., a first side member 248 and a second side member 250). The body member 244 also defines a centerline 252 extending radially from the longitudinal axis 238 and bisecting the body member 244. The side members 248, 250 can be disposed on either side of the centerline 252. As illustrated, the body member 244 may be thin (i.e., formed of one or more thin sheets of material) and substantially planar so as to minimize volume. The body member 244 further includes a primary attachment feature 254 that is useful to mate and/or adjoin the lubricant guide member 222 to components of the lubricating system 102 (FIGS. 2 and 3). In one example, the primary attachment feature 254 comprises one or more thru-holes or openings that penetrate the body member 244. These through-holes can be equally spaced on opposite sides of the centerline 252, although the position of these through-holes can also match corresponding holes found on other components. For example, when incorporated into the lubricating assembly 100 (FIG. 2), the primary attachment feature 254 can be configured to allow the body member 244 to couple with the bearing clamp member 220 via fasteners (e.g., bolts). In this position, the body member 244 can reside transverse (e.g., perpendicular) to the longitudinal axis 238 and the thru-holes can align with mating holes in the bearing clamp member 220 (FIG. 4).

As also shown in FIG. 4, the side members 248, 250 can include a first member 256 and second member 258 that couple with one another at an edge 260. The first member 256 extends transversely away from the body member 246 along the longitudinal axis 238. This configuration forms a lubricant flow surface 262 and a flow tab 264 (also "tab member 264"), both of which can facilitate migration of lubricant, as discussed herein. The second member 258 can have a secondary attachment feature 266 that is configured to facilitate mating with adjoining components of the lubricating system 102 (FIG. 3). Near the flow tab 264, the lubricant guide member 222 can include a stress relief feature 268 that can reduce local stress concentrations in the component. In one example, the first member 256 is perpendicular to the central portion 246 within reasonable manufacturing tolerances. The first member 256 can include a first part and a second part, one each that extends from the back side 236 of the central portion 246 and the front side 234 of the central portion 248, respectively. However, this disclosure contemplates configurations for the first member 256 wherein the first part and the second part are configured to extend along the longitudinal axis 238 on one, both, or either the front side 234 and the back side 236 of the central portion 246, as desired.

The second member 258 is configured in spaced relation to, or is spaced longitudinally apart from, the central portion 246 of the body member 244 (along the longitudinal axis 238). The spacing can be measured from a plane that is tangent to at least two points on a surface of the second member 258 and a plane that is tangent to at least two points on a surface of the central portion 246. Typically, the first plane and the second plane are parallel; however this configuration is not always the case. In one embodiment, the second member 258 extends in a direction generally downwardly from the first member 256 (also, transversely below the first member 256), in a direction along the centerline 252 toward the bottom of the body member 244. In one example, the secondary attachment feature 266 comprises one or more thru-holes or openings that penetrate the second member 258. These holes can be equally spaced on opposite sides of the centerline 252, although the position and construction of the holes may depend on corresponding holes found on components of the lubricating system 102 (FIG. 3). In one example, the thru-holes receive fasteners (e.g., bolts) that permit the lubricant guide member 222 to be bolted directly to the bearing carrier member 128 (FIGS. 2 and 3).

As best shown in FIG. 5, the lubricant flow surface 262 slopes (and/or tapers) at an angle α with respect to each of the longitudinal axis 238 and the centerline 252. Generally, the angle α configures the slope of the lubricant flow surface 262 inwardly (i.e., toward the centerline 252) and downwardly (i.e., toward bottom of the lubricant guide member 222). This configuration directs a fluid towards the centerline 252 and the top of the bearing clamp member 220 (FIG. 4). In one example, the angle α is in a range between 20 and 60 degrees. This angle configures the lubricant flow surface 262 to at least partially enable the passive, gravity-assisted lubricant return mechanism to capture and direct lubricant toward the center of the lubricant guide member 222. For purposes of example, one implementation of the lubricant guide member 222 utilizes the side members 248, 250 to direct a fluid lubricant F down the lubricant flow surface 262 towards the central portion 246. In one example, the lubricant can flow down the lubricant flow surface 262 to the reservoir region 240 (FIG. 4) of the bearing clamp member 220 (FIG. 4).

Examples of the stress relief feature 268 form a fillet with oversized radius at a corner at which the first member 256 adjoins the central portion 248 in each of the first side portion 250 and the second side portion 252. The lubricant guide member 222 can also include a tab member 264 (also, flow tab 264") proximate this corner. In one example, the second part of the first member 256 forms the tab member 264, wherein the tab member has a second surface angled upwardly from the corner toward the centerline 254 and the top of the body member 246. Formation of the flow tab member 264 by metal bending may cause excessive residual stress in the corner, and the stress relief feature 268 greatly reduces the probability of crack propagation.

Construction of the lubricant guide member 222 may utilize various materials and techniques. The lubricant guide member may, for example, have a monolithic and/or unitary construction that utilizes a thin planar material, such as sheet metal or like thin materials of substantially uniform thickness. The sheet metal may be bent and formed into the various portions (e.g., the body member 246 and the side portions 250, 252). In other examples, one or more of the portions may be formed separately and secured together, e.g., via welding and/or other fastening techniques.

In view of the foregoing, the lubricant guide member of the present disclosure offers several improvements over convention lubricating devices found in compressors and related machinery. One of the improvements of the present disclosure is that the lubricant guide member may be formed from a single piece of sheet metal, thereby reducing the number of weldments, decreasing labor and material cost, and increasing reliability. Another improvement is that the increased inlet area, which defines the distance between opposing lubricant flow surfaces, allows more lubricant to flow into the reservoir for better reservoir management. Another improvement is that the peak stresses in the guide member have been reduced by about 60% and the deflection has been decreased by about 35%. Furthermore, the first-order resonance or excited failure mode of the guide member has been increased from about 49 Hz to about 142 Hz, which significantly decreases the probability of a modal failure.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lubricant guide member for a splash lubrication oil system, said lubricant guide member comprising:
   a body member having a first side, a second side, a longitudinal axis, and a centerline extending radially from the longitudinal axis, the body member comprising a primary attachment feature that forms openings disposed in a direction of the longitudinal axis; and
   side members comprising a first side member and a second side member coupled with the body member and disposed on either side of the centerline, the first side member and the second side member comprising a first member and a second member, the first member coupled with the body member and extending transversely away from the body member on the second side along the longitudinal axis, the second member coupled with the first member and spaced apart from the body member along the longitudinal axis, the second member extending in a direction along the centerline toward the longitudinal axis, wherein the first member comprises a lubricant flow surface disposed at an angle with respect to each of the longitudinal axis and the centerline such that the lubricant flow surface defines a substantially straight linear slope extending inwardly towards the centerline and downwardly towards a bottom of the body member.

2. The lubricant guide member of claim 1, wherein the first member is formed integrally with the body member.

3. The lubricant guide member of claim 2, wherein the second member is formed integrally with the first member.

4. The lubricant guide member of claim 1, further comprising one or more stress relief features at a corner at which the first member couples with the body member.

5. The lubricant guide member of claim 4, further comprising a tab member adjacent the stress relief feature, wherein the tab member extends from the first member towards the centerline.

6. The lubricant guide member of claim 5, wherein the tab member extends toward the centerline at an angle away from the longitudinal axis.

7. The lubricant guide member of claim 5, wherein the tab member is disposed on the first side of the body member.

8. The lubricant guide member of claim 1, wherein the first side member and the second side member are disposed symmetrically about the centerline.

9. The lubricant guide member of claim 1, wherein the primary attachment feature comprises a pair of thru-holes spaced from the centerline.

10. The lubricant guide member of claim 1, wherein the second member of the side members defines a secondary attachment feature that forms openings disposed in the direction of the longitudinal axis.

11. The lubricant guide member of claim 10, wherein the secondary attachment feature comprises a pair of thru-holes spaced from the centerline.

12. A compressor, comprising:
   a splash lubricant oil system comprising a shaft member and a lubricant guide member extending circumferentially over at least part of the shaft member, the lubricant guide member comprising a body member having a top and a bottom proximate the shaft member, the body member comprising a central portion with a first side, a second side, and side members comprising a first side member and a second side member disposed on either side of a centerline bisecting the central portion, each side member having a first member and a second member, the first member coupled with the central portion and comprising a first part extending perpendicularly away from the second side of the central portion, the second member coupled with and extending downwardly from the first member along the centerline toward the bottom of the body member, wherein the first member comprises a lubricant flow surface disposed at a first angle with respect to each of the longitudinal axis and the centerline that configures the lubricant flow surface to direct lubricant towards the shaft member, wherein the lubricant flow surface defines a substantially straight linear slope extending inwardly towards the centerline and downwardly towards a bottom of the body member.

13. The compressor of claim 12, wherein the first member is formed integrally with the body member.

14. The compressor of claim 13, wherein the second member is formed integrally with the first member.

15. The compressor of claim 12, wherein the first member has a second part that extends perpendicularly away from the central portion in a direction towards the first side, the second part forming a tab member proximate the corner, and wherein the tab member extends from the second part towards the centerline at a second angle away from the longitudinal axis.

16. The compressor of claim 15, wherein the body member incorporates a fillet with a radius forming a corner at which the first member adjoins the central portion in each of the first side member and the second side member.

17. The compressor of claim 12, wherein the second member is spaced apart from the central portion as measured between a first plane that is tangent to at least two points on the first side of the second member and a second plane tangent to at least two points on the first side of the central portion.

18. The compressor of claim 17, wherein the first plane is parallel to the second plane.

19. The compressor of claim 12, wherein the body member is configured with a plurality of through-holes comprising a first set of through-holes disposed in the central portion proximate the bottom of the body member and a second set disposed in the second member.

20. The compressor of claim 19, wherein the splash lubricant oil system comprises a bearing assembly with a bearing carrier member, and wherein the first set of through holes are configured to align with holes on the bearing carrier member.

* * * * *